(12) United States Patent
Duran

(10) Patent No.: US 6,688,780 B2
(45) Date of Patent: Feb. 10, 2004

(54) CANTILEVERED SHUTTER FOR OPTICAL ADAPTER

(75) Inventor: Jaime Duran, Chicago, IL (US)

(73) Assignee: Amphenol Corporation, Wallingford, CT (US)

( * ) Notice: Subject to any disclaimer, the term of this patent is extended or adjusted under 35 U.S.C. 154(b) by 16 days.

(21) Appl. No.: 10/067,270

(22) Filed: Feb. 7, 2002

(65) Prior Publication Data

US 2003/0147597 A1 Aug. 7, 2003

(51) Int. Cl.$^7$ ............................. G02B 6/38; G02B 6/36
(52) U.S. Cl. ............................. 385/76; 385/92; 385/77
(58) Field of Search ...................... 385/76–78

(56) References Cited

U.S. PATENT DOCUMENTS

| | | | |
|---|---|---|---|
| 4,107,242 A | 8/1978 | Runge ........................... 264/1 |
| 4,277,135 A | 7/1981 | Schrott et al. ........... 350/96.21 |
| 4,479,910 A | 10/1984 | Kurokawa et al. ........... 264/2.5 |
| 4,557,554 A | 12/1985 | Blanc ......................... 385/88 |
| 4,611,887 A | 9/1986 | Glover et al. ............ 350/96.21 |
| 4,640,575 A | 2/1987 | Dumas ....................... 385/134 |
| 4,673,242 A | 6/1987 | Logan et al. ................. 385/93 |
| 4,712,861 A | 12/1987 | Lukas et al. ............. 350/96.21 |
| 4,767,179 A | 8/1988 | Sampson et al. ............. 385/84 |
| 4,779,950 A | 10/1988 | Williams ................. 350/96.21 |
| 4,986,626 A | 1/1991 | Bossard ..................... 350/96.2 |
| 5,016,968 A | 5/1991 | Hammond et al. ......... 350/96.2 |
| 5,052,775 A | 10/1991 | Bossard et al. ............... 385/76 |
| 5,104,242 A | 4/1992 | Ishikawa ..................... 385/53 |
| 5,123,071 A | 6/1992 | Mulholland et al. .......... 385/53 |
| 5,142,597 A | 8/1992 | Mulholland et al. .......... 385/56 |
| 5,166,995 A | 11/1992 | Briggs et al. ................. 385/58 |
| 5,202,949 A | 4/1993 | Hileman et al. ............ 385/134 |
| 5,214,730 A | 5/1993 | Nagasawa et al. ............. 385/59 |
| 5,265,184 A | 11/1993 | Lebby et al. ............... 385/132 |
| 5,287,426 A | 2/1994 | Shahid ........................ 385/85 |
| 5,311,604 A | 5/1994 | Rogner et al. ................. 385/14 |
| 5,317,663 A | 5/1994 | Beard et al. ................... 385/70 |
| 5,329,604 A | * 7/1994 | Baldwin et al. ............... 385/92 |
| 5,333,221 A | 7/1994 | Briggs et al. ................. 385/55 |
| 5,335,301 A | 8/1994 | Newman et al. .............. 385/75 |
| 5,337,385 A | 8/1994 | Baderschneider et al. ..... 385/59 |
| 5,343,544 A | 8/1994 | Boyd et al. ................... 385/46 |
| 5,348,487 A | 9/1994 | Marazzi et al. ............. 439/138 |
| 5,363,460 A | 11/1994 | Marazzi et al. ............... 385/70 |
| 5,373,574 A | 12/1994 | Marazzi ....................... 385/78 |
| 5,388,174 A | 2/1995 | Roll et al. .................... 385/80 |
| 5,420,951 A | 5/1995 | Marazzi et al. ............... 385/75 |
| 5,436,987 A | 7/1995 | Saito et al. ................... 385/16 |
| 5,481,633 A | 1/1996 | Mayer ......................... 385/49 |
| 5,506,922 A | 4/1996 | Grois et al. ................... 385/75 |
| 5,570,445 A | 10/1996 | Chou et al. ................... 385/92 |
| 5,577,146 A | 11/1996 | Musk .......................... 385/92 |
| 5,587,116 A | 12/1996 | Johnson et al. ............ 264/1.25 |
| 5,603,870 A | 2/1997 | Roll et al. ................. 264/1.25 |

(List continued on next page.)

FOREIGN PATENT DOCUMENTS

EP    O 788 002 A1    8/1997

*Primary Examiner*—Michael C. Zarroli
(74) *Attorney, Agent, or Firm*—Blank Rome LLP

(57) ABSTRACT

A light-blocking safety shutter is mounted in a fiber-optic adapter housing that mates with a standard fiber-optic male connector of the type with a fiber-containing ferrule protruding from a forward end. The shutter is mounted in the insertion passage of the adapter and is held in the light-blocking position by the cantilever manner in which the shutter is attached. The shutter may have several different shapes depending on the type of adapter in which it is mounted, including a shutter with a flat bumper panel or a shutter with raised dimple on the bumper panel. The bumper panel contacts the body of the inserted connector and takes the force that opens the shutter so that the ferrule is protected from contacting the shutter. The fiber-optic adapter may include one or more housings for receiving one or more fiber-optic male connectors, whereby the housing includes a shutter mounted in a cantilevered manner.

20 Claims, 5 Drawing Sheets

U.S. PATENT DOCUMENTS

| | | | |
|---|---|---|---|
| 5,692,080 A | 11/1997 | Lu | 385/60 |
| 5,708,745 A | 1/1998 | Yamaji et al. | 385/92 |
| 5,716,224 A | 2/1998 | Masuda et al. | 439/138 |
| 5,815,621 A | 9/1998 | Sakai et al. | 385/80 |
| 5,825,955 A | 10/1998 | Ernst et al. | 385/79 |
| 5,845,036 A | 12/1998 | De Marchi | 385/139 |
| 5,883,995 A | 3/1999 | Lu | 385/60 |
| 5,956,444 A | 9/1999 | Duda et al. | 385/53 |
| 5,964,600 A | 10/1999 | Miles et al. | 439/140 |
| 5,971,625 A | 10/1999 | Lu | 385/60 |
| 5,984,531 A | 11/1999 | Lu | 385/60 |
| 5,987,202 A | 11/1999 | Gruenwald et al. | 385/49 |
| 6,004,043 A | 12/1999 | Abendschein et al. | 385/76 |
| 6,074,577 A | 6/2000 | Katsura et al. | 264/1.25 |
| 6,076,973 A | 6/2000 | Lu | 385/60 |
| 6,076,975 A | 6/2000 | Roth | 385/76 |
| 6,079,881 A * | 6/2000 | Roth | 385/76 |
| 6,081,647 A | 6/2000 | Roth et al. | 385/139 |
| 6,096,229 A | 8/2000 | Shahid | 216/2 |
| 6,108,482 A | 8/2000 | Roth | 385/139 |
| 6,129,865 A | 10/2000 | Jeong et al. | 264/1.25 |
| 6,142,676 A | 11/2000 | Lu | 385/60 |
| 6,296,398 B1 | 10/2001 | Lu | 385/60 |
| 6,302,592 B1 | 10/2001 | Zullig | 385/60 |
| 6,331,079 B1 | 12/2001 | Grois et al. | 385/53 |
| 6,352,375 B1 | 3/2002 | Shimoji et al. | 385/92 |
| 6,361,218 B1 | 3/2002 | Matasek et al. | 385/60 |
| 6,371,657 B1 | 4/2002 | Chen et al. | 385/58 |
| 6,406,192 B1 | 6/2002 | Chen et al. | 385/56 |
| 6,425,694 B1 | 7/2002 | Szilagyi et al. | 385/76 |
| 6,461,054 B1 * | 10/2002 | Iwase | 385/73 |
| 6,471,412 B1 | 10/2002 | Belenkiy et al. | 385/53 |
| 6,471,416 B2 | 10/2002 | Lu | 385/60 |
| 6,481,902 B2 * | 11/2002 | Takaoka et al. | 385/92 |
| 2001/0041030 A1 | 11/2001 | Chen et al. | 385/88 |
| 2001/0048790 A1 | 12/2001 | Burkholder et al. | 385/78 |
| 2002/0150342 A1 | 10/2002 | Kiani | 385/53 |

* cited by examiner

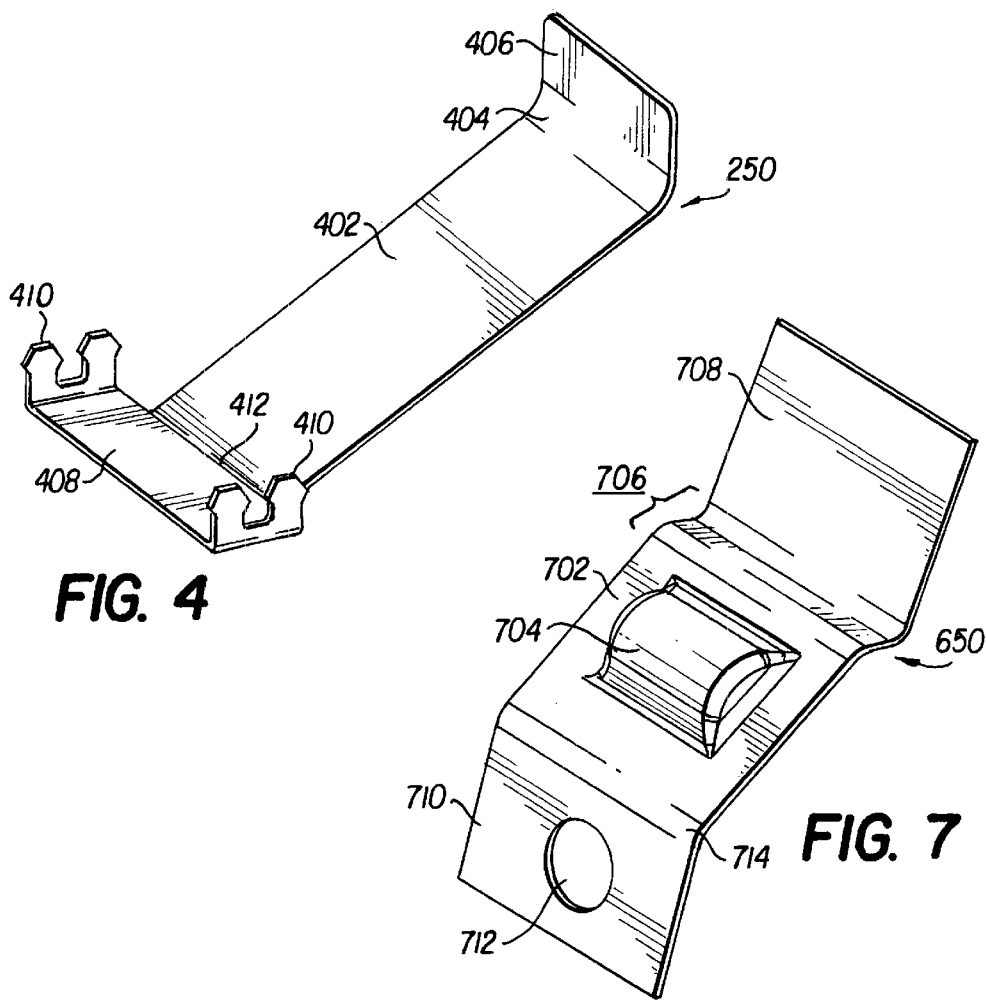
FIG. 4
FIG. 7
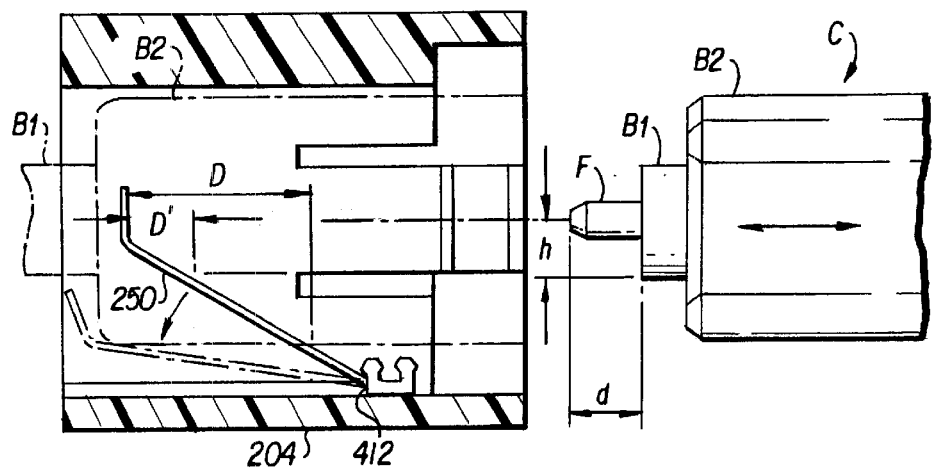
FIG. 5

CANTILEVERED SHUTTER FOR OPTICAL ADAPTER

BACKGROUND OF THE INVENTION

1. Field of the Invention

The present invention relates to a light-blocking shutter in a fiber-optic connector or adapter that prevents light emissions from the fiber-optics of the connector when the adapter is open (i.e., when no mating connector is inserted). This prevents eye damage if a person should look into the open end of the connector that is carrying an optical signal. More specifically, the invention relates to light-blocking shutters in fiber-optic adapters that automatically block the opening through which the light signal is transmitted when a mating connector is removed and automatically open when the mating connector is inserted.

2. Description of the Prior Art

FIG. 1, labeled "Prior Art," shows a typical fiber-optic connector C with a ferrule F, having centrally-located optical fiber (or fibers) O terminating at its surface, extending from the end of a connector body B1. Outer body B2 slides over connector body B1. It is well known that damage to the end of the optical fiber O itself (dirt or scratches) can also cause severe scattering of the light beam emitted from the optical fiber O and insertion loss, potentially rendering the connector C inoperative.

Since the light used in fiber optic communications is generated by lasers, the light can potentially cause damage to the eyes. The recent trend toward more powerful signal lasers has made fiber optics more dangerous than they were previously. Thus, a number of patents disclose fiber-optic adapters with spring-loaded shutters that are pushed inward by the insertion of a male connector to prevent light emissions from the adapter. U.S. Pat. No. 6,004,043 to Abendschein et al., for example, discloses a spring-loaded shutter door that is disposed at an angle θ inwardly into the receptacle and is pushed out of the way by the inserted male connector (Col. 3, lines 50–54). The inserted male connector contacts the shutter near the sping-loaded hinge, which requires a greater force than if the connector contacted the shutter at a distance from the spring-loaded hinge.

U.S. Pat. No. 6,142,676 to Lu discloses an internal beam stop door. The door is biased by a spring and limited by stop posts (Col. 4, lines 6–21). The door is angled at about 20° off the transverse. As seen in FIGS. 23–27, the door is first pushed inward by a cover and then by a prong (FIG. 24). Once the door is held up out of the way, continued insertion operates a cam mechanism that raises the cover (FIG. 26) so that it comes to rest against the raised door (FIG. 27).

It is noted in Lu that slanting the shutter does not actually increase the leverage and does nothing to solve the leverage problem discussed above, as long as the engagement is laterally near to the hinge. This is because the torque required to open the shutter is the product of the force and the distance from the line of the force to the hinge. The line of force extends parallel to the motion of the male connector.

U.S. Pat. No. 6,108,482 to Roth discloses as one of its objects the prevention of damage to the tip of a male optical-fiber connector (Col. 1, line 61, to Col. 2, line 6). Roth shows a spring-loaded shutter in which the shutter surface is divided into a recessed area and a surrounding ledge having a raised surface (Col. 3, lines 47–49 and lines 59–61). The male connector that pushes open the shutter has a projecting optical fiber ferrule with a "front mating face" that "engages outer surface of shutter and automatically opens the shutter" (Col. 4, lines 11–14). The shutter's recess is intended to protect the central area of the mating face, where the fiber termination is located: "Recessed area has a depth such that the polished ends of the optical fibers are protected" (Col. 4, line 17). The fiber termination, but not the ferrule itself, is protected.

The structure disclosed in Roth has several disadvantages. When the ferrule hits the shutter it is subjected to forces that would better be taken by the shoulder of the connector body surrounding it. Roth actually teaches against opening the shutter by pushing it with anything except for the ferrule, stating that the recess "should be designed with a depth slightly less than the distance the ferrule projects from the fiber optic connector" (Col. 3, lines 53–55; Col. 2, lines 32–34).

The above-cited hinged or spring-loaded shutters also have the disadvantage that they require additional manufacturing steps to insert both the shutter and the hinges and/or springs associated with the shutter. In addition, if the hinges or springs fail, the shutter will become inoperative within the adapter because the shutter will fail to automatically return to the light blocking position. Non-spring loaded shutters, like those mounted in a cantilevered manner, would potentially eliminate this problem.

U.S. Pat. No. 5,104,242 to Ishikawa, for example, discloses a flexible, light-impermeable shutter that covers the optical path of light from a fiber optic source by blocking a portion of the insertion passage inside the adapter. It is connected near the opening of the passage in a cantilevered manner as best seen in FIGS. 1 and 3. Although the shutter is curved so that the sensitive tip of the ferrule does not contact the spring, the ferrule housing contacts the spring during insertion of the connector, as shown in FIG. 3. In Ishikawa, the shutter is located interiorly of the ferrule insertion hole (FIG. 1), which is separate from the insertion passage for the connector body.

U.S. Pat. No. 5,570,445 to Chou et al. discloses a hinged (FIG. 1A) or optionally "resilient tongue" (Col. 8, lines 1–5) light-blocking shutter disposed within a fiber optic adapter. The shutter is attached to the inner surface of the housing of the adapter. Given the configuration of the connector, the ferrule tip (FIG. 2C) contacts the shutter directly when the connector is inserted into the adapter.

U.S. Pat. No. 5,708,745 to Yamaji et al. discloses a pair of mating optical shields formed over the opening of an adaptor insertion passage (FIG. 1) and connected to the opening of the adapter in a cantilevered manner with a spring bias that disposes the shields in a closed position to prevent optical emissions.

U.S. Pat. No. 6,302,592 to Züllig discloses as the prior art, an interiorly disposed, hinged shutter for use with fiber optic adapters for preventing emissions of light (citing U.S. Pat. No. 5,363,460 to Marazzi et al.). Specifically, Züllig shows a spring-loaded, hinged "radiation protection" shutter attached to the housing of the adaptor and forming a cantilever (FIG. 1). A leaf-spring is attached to the lower portion of the shutter to hold the shutter in a light-blocking position when there is no male connector situated in the insertion passage of the adapter (FIG. 1).

SUMMARY AND OBJECTS OF THE INVENTION

In view of the foregoing, it should be apparent that there still exists a need for an apparatus for blocking light emissions from a fiber optic connector in an open adapter using a cantilevered shutter that does not require a hinge or spring, that is designed to swing open by a force exerted far from the connection point, and that uses a simple, inexpensive, and foolproof shape that ensures that the delicate tip of the inserted connector does not contact the shutter, risking damage.

It is, therefore, an object of the invention to provide a fiber optic adapter that has a light-blocking shutter inside the insertion passage of the adapter that prevents light emissions from a fiber optic cable connected to one end of the adapter from causing eye injury.

It is another object of the invention to provide a fiber optic adapter that has a shutter that is attached to the adapter in a cantilevered manner.

It is still another object of the invention to provide a fiber optic adapter that has a shutter made of a material that automatically returns the shutter into a light-blocking position inside the adapter when a male connector is removed from the adapter.

It is another object of the invention to provide a fiber optic adapter that has a light-blocking shutter that does not require a hinge or spring to operate the shutter so as to simplify the manufacturing process and enhance the reliability of the shutter.

Briefly described, these and other objects of the invention are accomplished in accordance with its apparatus aspects by providing a female or receptacle connector or adapter with a passage having a light-blocking shutter that is connected to the adapter in a cantilevered manner. The adapter passage may accept mating male connector or plug, such as for example the SC connector shown in FIG. 1, in such a way that the fiber optic end O is aligned with and juxtaposed to another fiber end very precisely, so that light is transferred into (or from) the fiber end O. The adapter holds the other fiber. When that other fiber is active, light is emitted from its terminus and will shine out of the passage when the male connector is not inserted in the adapter passage. Single and multiple-housing adapters holding two connectors in opposite relationship to each other (i.e., a bi-directional adapter), and adapters holding more than two connectors in opposite relationship to each other, are contemplated.

The invention provides a shutter on one side (or both sides) of the adapter passage to block the light emissions from the optical fibers. It is pushed out of the way by the male connector (e.g., that of FIG. 1) when the male connector is inserted. The shutter is cantilevered so as to remain in a light-blocking position until pushed open, and to automatically spring back when the male connector is withdrawn due to the material used to make the shutter. Preferably, the shutter is made by die-cast or cutting and stamping a metallic sheet. It may also be made by other common metal working processes. The shutter may also be made of plastic or a metallic-coated plastic as long as there is nearly zero-percent light transmission (i.e., about 100-percent opacity) through the shutter. Any suitable materials and manufactures are within the scope of the invention.

The shutter includes a light-blocking panel portion, a bumper panel portion and a base plate portion. In the first embodiment of the shutter, the bumper panel is the first part to contact the male connector when the male connector is inserted in the insertion passage, and is placed so that only the shoulder of the body of the male connector, and not the ferrule or optical end, touches it. By taking all of the insertion force, the bumper panel protects the delicate extending tip of the male connector (e.g., the ferrule F of FIG. 1). The fastening portion includes two C-shaped ends on either side of the shutter for snap-fitting onto a coupling sleeve inserted into the adapter.

In the second embodiment of the shutter, the bumper panel includes a dimple protruding above the surface of the bumper panel. The dimple is the first part to contact the male connector in the same manner as described above. The fastening portion of the shutter of the second embodiment includes a circular hole through the base plate for receiving a rivet, pin, screw or other device for attaching the shutter to the adapter.

To further protect the ferrule, the leading edge of the bumper (the edge foremost in the longitudinal direction, that first contacts the inserted connector body) is preferably set back from the front surface of the adapter body by a longitudinal-depth distance greater than the bumper height (and therefore also greater than the longitudinal ferrule extension d). When this set-back is greater than d, the tip of the ferrule F will not touch the leading edge of the shoulder if the connector is inserted off-center. The setback or longitudinal-depth distance not only helps to prevent ferrule contact, it also makes it more difficult to open the shutter with a finger, pencil, or the like because the bumper is recessed into the adapter body.

It is preferred that in the transverse direction (the direction perpendicular to the longitudinal or insertion direction), the bumper panel height be greater than the distance between the center of the ferrule F tip and the edge of the shoulder of the ferrule body (FIG. 1). This ensures that the entire optical path of the optical fiber O is blocked by the bumper panel portion of the shutter.

It is also preferred that in the transverse direction, the separation between the side of the ferrule and the adjacent outside of the connector body exceeds the transverse distance from the side of the adapter body aperture to the top of the bumper; that is, the ferrule is "above" the bumper panel. Such a relationship ensures that when the outside of the male connector body is against the inside of the passage aperture, the ferrule does not touch the bumper.

The connector housing includes a space into which the shutter is substantially recessed when the male connector is fully inserted, thus eliminating any interference with light transmission that the shutter may cause.

The bumper panel increases the mechanical advantage of the male connector in swinging the shutter out of the way. Besides extending along the insertion axis to protect the connector tip, the bumper panel also extends away from the hinge line in a direction that is transverse to the insertion direction, i.e., toward the middle of the insertion passage. This increases the torque acting on the shutter relative to the hinge line, and makes for faster and easier shutter opening and decreased force on the shutter hinges as the male connector is advanced into the insertion passage.

BRIEF DESCRIPTION OF THE DRAWINGS

FIG. 3a is a drawing of an exploded perspective view of the adapter shown in FIG. 2a;

FIG. 4 is a drawing of a perspective view of the shutter shown in FIGS. 2a, 3a and 3b;

FIG. 5 is a drawing of a partial cross-sectional view along line 5—5 of FIG. 2a before completion of the assembly showing the male connector before and after insertion;

FIG. 7 is a drawing of a perspective view of the shutter shown in FIG. 6; and

DETAILED DESCRIPTION OF THE INVENTION

Figure 1:
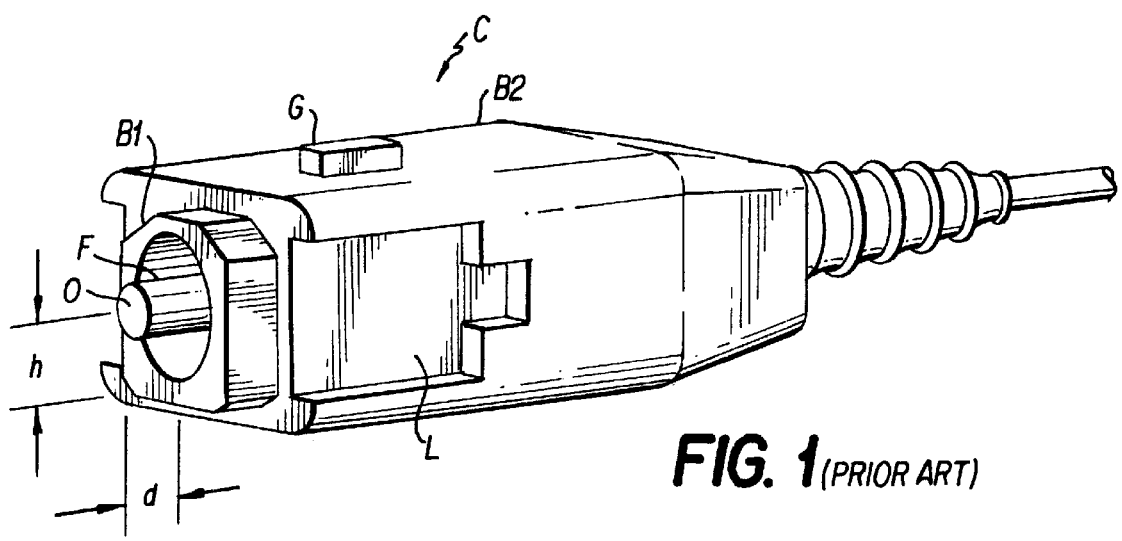
FIG. 1, labeled "Prior Art", is a drawing of a perspective view of a male connector.

Several preferred embodiments of the invention are described below for illustrative purposes, it being understood that the invention may be embodied in other forms not specifically shown in the drawings. Thus, while the invention is described with reference to two preferred shutters mounted in two particular adapters, other combinations of the shutters with other adapters, such as SC and MTP®/MPO® adapters, are also fully contemplated.

FIG. 1 is a drawing of a perspective view of an exemplary male connector C, in this case an SC fiber-optic connector. The connector C mates with the adapter of the invention by fitting into a passage of the adapter housing, as discussed below. The connector C includes a ferrule F holding the optical fiber 0, an inner body B1 holding the ferrule F, and an outer body B2 which slides longitudinally over the inner body B1 as part of the latch mechanism L, which is conventional and shall not be discussed. The ferrule F protrudes a distance d from the extreme end of the inner body B1, in the longitudinal direction, and a distance h from the edge of the outer body B2.

Figure 2A:
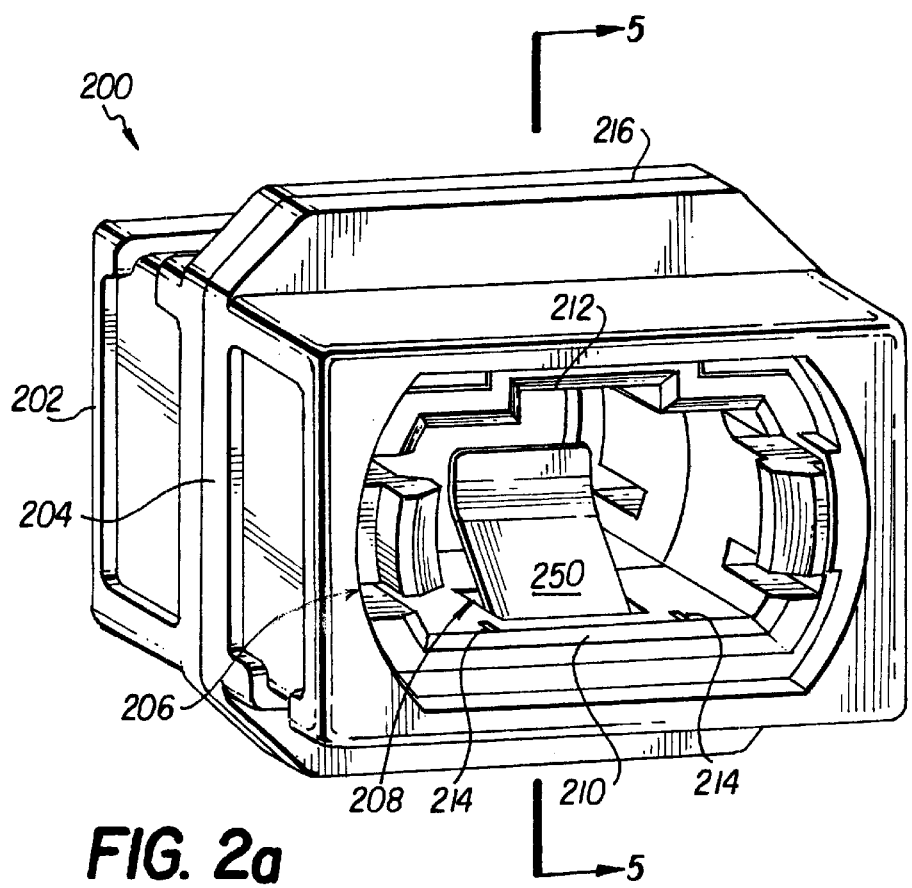
FIG. 2a is a drawing of a perspective view of an assembled, two-piece housing adapter according to one embodiment of the present invention with a light-blocking shutter in the light-blocking position.

FIG. 2a is a drawing of a perspective view of an assembled adapter 200 according to one embodiment of the invention with the shutter 250 in the light-blocking position. The adapter 200 includes two housing pieces 202, 204 mated together to form a single piece. The housing pieces 202, 204 may be made of any suitable material, but preferably they are made from metal and/or plastic. One method of connecting the two housing pieces 202, 204 is to ultrasonically welded them together. The result is a bi-directional adapter in which two male connectors can be inserted, one in the front housing section 204, and another in the back housing piece 202. The housing pieces 202, 204 have outwardly-extending surfaces forming a flange 216. The flange may have many different industry-standard and non-standard configurations (e.g., EMI, standard, reduced profile, etc.), and may be located in various positions on the housing pieces 202, 204. In FIG. 2a, the flange 216 is located on the top of the adapter 200 (an identical flange is also located on the bottom of the adapter 200).

The shutter 250 shown in FIG. 2a extends inwardly away from the opening of the insertion passage 206 at an angle. The lower portion of the shutter 250 extends through a recess 208 located in the bottom of a coupling sleeve 210 and connects to the coupling sleeve 210 through clip openings 214. The coupling sleeve 210 preferably includes a slot 212 (also seen in FIG. 3a) that mates with a guide G on the outer body B2 of the male connector C, seen in FIG. 1.

Figure 2B:
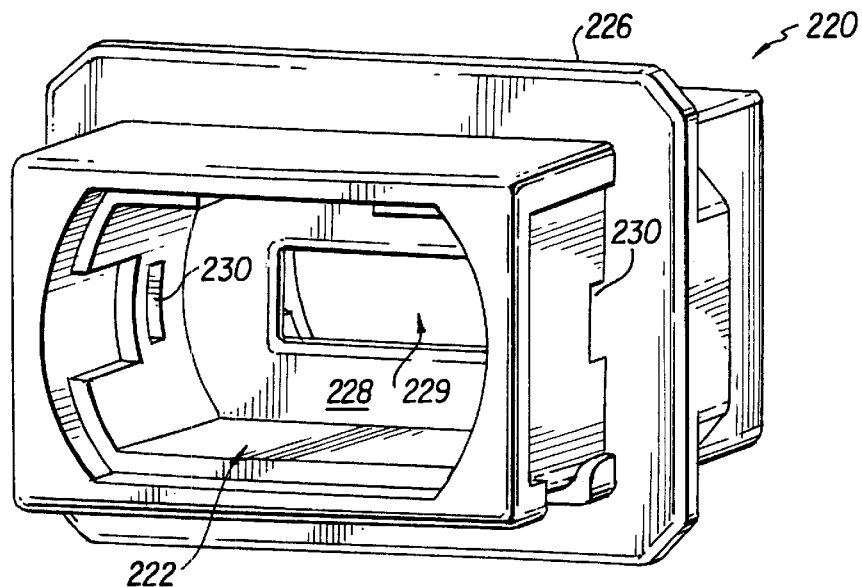
FIG. 2b is a drawing of a perspective view of a one-piece adapter according to the present invention.

FIG. 2b is a drawing of a one-piece housing adapter 220 having front and back insertion passages 222, 224 (only the front insertion passage 222 is shown). For clarity, adapter 220 is shown without the shutter 250 mounted in the insertion passage 222. The adapter 220 can be used in the same manner as the two-piece housing adapter 200 shown in FIG. 2a to provide for a bi-directional adapter in which two male connectors C can be inserted. One difference between the adapter 220 and the adapter 200 is that the coupling sleeve notches 230 on the sides of the insertion passage 222 of the adapter 220 are used to accept latches 266 associated with a coupling sleeve 262 (FIG. 3b) and thereby secure the coupling sleeve 262 inside the adapter 220. The notches and latches eliminate the need for a separate device to secure the coupling sleeve 262 inside the insertion passage 222 and also reduces the number of manufacturing steps required to fabricate the adapter 220.

Also shown on FIG. 2b is an outwardly-extending, peripherally mounted surface forming a flange 226. As noted above, any configuration for the flange 226 may be used, depending on the application. A wall 228 bisects the insertion passages 222, 224. The wall 228 is preferably made of a material that attenuates the electromagnetic field generated by the connector C so that it provides EMI shielding. The wall 228 includes a ferrule window 229 approximately centered on the wall 228 that is large enough to accommodate the approximate width of a typical ferrule F so that fiber-optic light from the connector C can pass unblocked from the front insertion passage 222 to the back insertion passage 224. The adapter 220 is preferably made of moldable metal, plastic or other suitable materials and is manufactured as a single piece (i.e., die-cast), eliminating the need to assemble individual components.

Figure 2C:
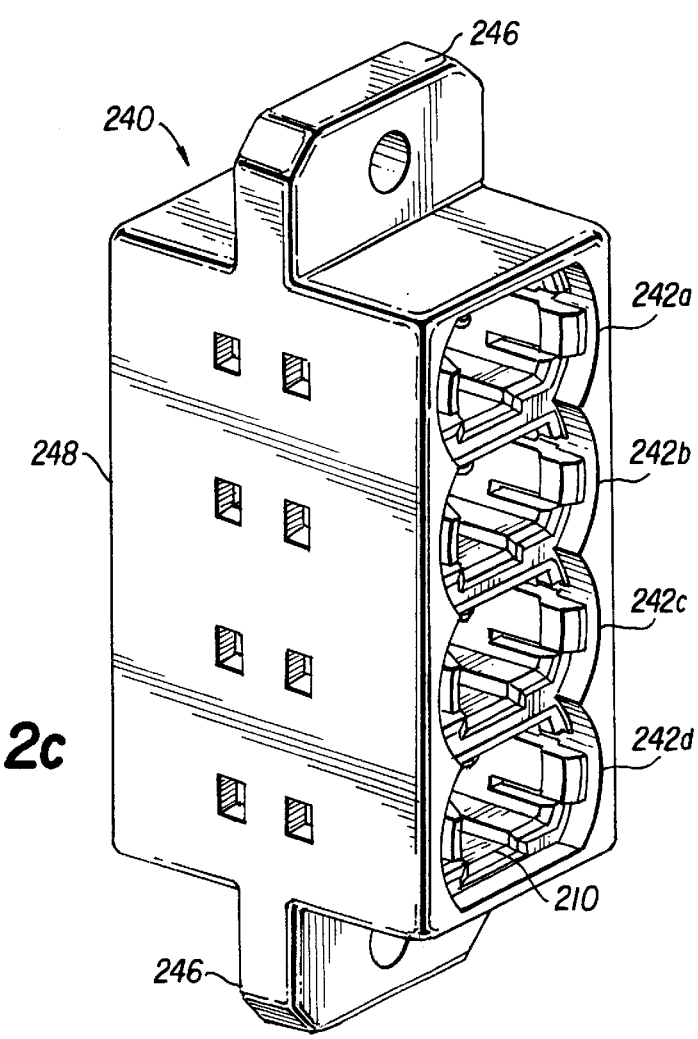
FIG. 2c is a drawing of a perspective view of multiple adapters of FIG. 2b in a linear stacked arrangement.

FIG. 2c is a drawing of a perspective view of a one-piece adapter 240 shown with four front insertion passages 242a–242d in a linear or stacked arrangement. Directly opposite the four front insertion passages 242a–242d are back insertion passages 244a–244d (not shown) forming four separate bi-directional adapters sharing the common housing 248. It will be appreciated by one of ordinary skill in the art that different configurations for the insertion passages 242a–242d and 244a–244d are contemplated without deviating from the spirit and scope of the invention. For example, the four insertion passages may be arranged in rows of two openings per row. Further, a different number of insertion passages may be included than the number shown in FIG. 2c. The adapter 240 has an outwardly-extending flange 246 on the top and the bottom of the adapter 240.

Figure 3A:
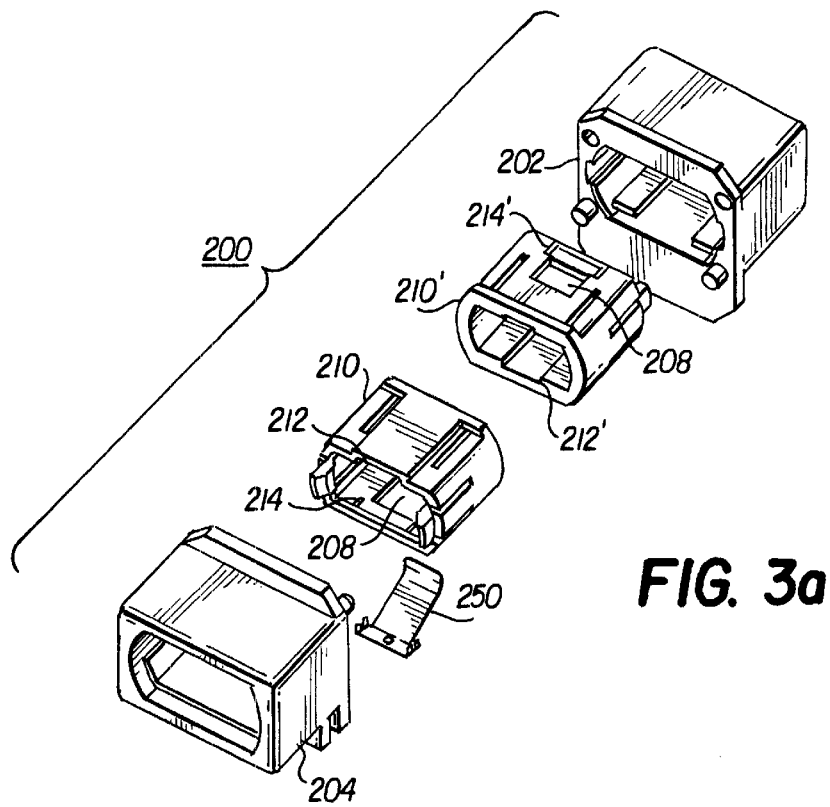

FIG. 3a is a drawing of an exploded perspective view of the adapter 200 shown in FIG. 2a. The front and back housing pieces 202, 204 each include a coupling sleeve 210, 210', respectively. The coupling sleeves 210, 210' each include recesses 208, 208' through which the shutters 250, 250' (only one shown) are inserted. The shutters 250, 250' are then clipped to the coupling sleeves using clip openings 214, 214'. Both shutters 250, 250' block light emissions from emanating from their respective end of the adapter 200.

In the embodiment illustrated in FIG. 3a, the two coupling sleeves 210, 210' are identical, although this is not a requirement of the invention. The coupling sleeves 210, 210' are designed to accommodate a specific shaped connector C. However, different coupling sleeves with different shapes may be substituted. Thus, various combinations of one piece or multiple piece housing adapters and various connectors may be used. It is contemplated that the coupling sleeves may be eliminated from the insertion passages where the housing includes the appropriate shape to receive a specific connector C.

Figure 3B:
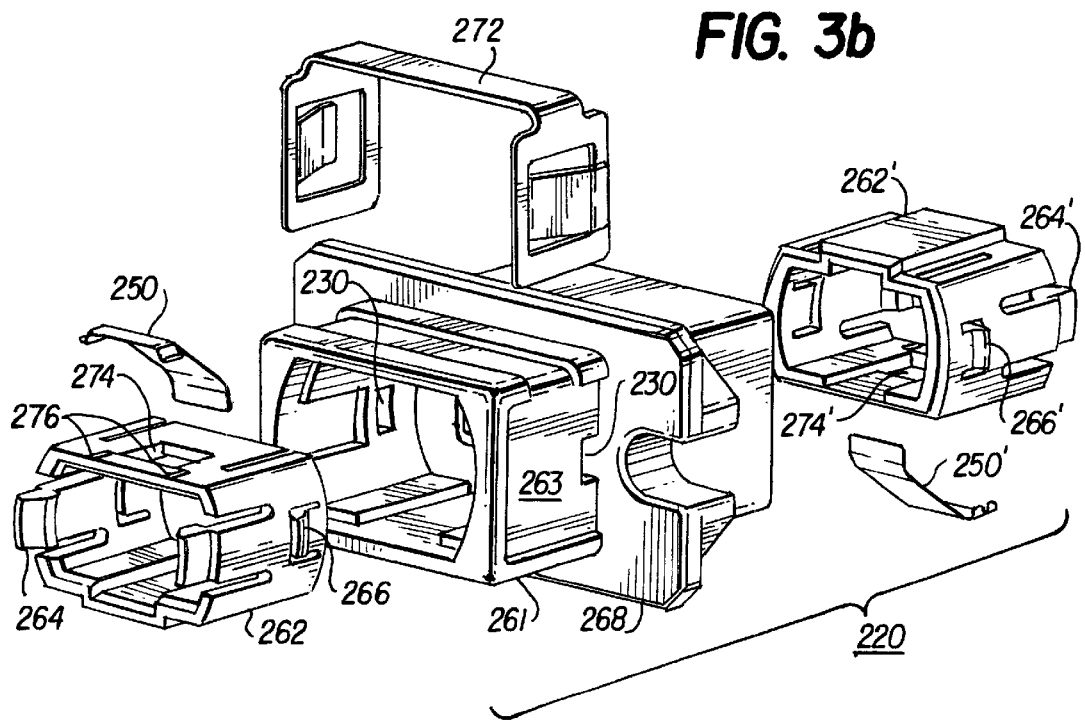
FIG. 3b is a drawing of an exploded perspective view of the adapter shown in FIG. 2b shown with coupling sleeves and shutters.

FIG. 3b is a drawing of an exploded perspective view of the adapter 220 shown in FIG. 2b with front and back coupling sleeves 264, 264', front and back shutters 250, 250', and mounting bracket 272. The mounting bracket 272 is attached to the housing 261 by snapping onto the recess 263. The adapter 220 shown in FIG. 3b is shown with a different flange 268 compared to FIG. 2b to illustrate the interchangeability of the flanges that is contemplated as part of the invention. The recesses 274, 274' are similar to the recesses 208, 208' (FIG. 3a) and are provided for receiving the shutters 250, 250'. The shutters 250, 250' are then clipped to the coupling sleeves 262, 262' using clip openings 276, 276'. As noted above, coupling sleeve notches 230, 230' are used to accept latches 266, 266' associated with a coupling sleeves 262, 262' (FIG. 3b) and thereby secure the coupling sleeves inside the adapter 220.

FIG. 4 is a drawing of a perspective view of the shutter 250 shown in FIGS. 2a and 3. The shutter 250 includes a bumper panel portion 402 that is used to make contact with the inner body B1 or outer body B2 of the connector C. A transition portion 404 connects the bumper 402 with the light-blocking panel portion 406. Although described separately, the three portions 402, 404, 406 can be made from a single piece of material that is formed into the shape shown in FIG. 4. Also, the shape of the individual portions may vary from those illustrated in FIG. 4. For example, the bumper 402, which is shown as a generally flat, rectangular piece in FIG. 4, could be a cylindrical rod or other shape, and it could be curved instead of flat, as long as it makes contact with the connector C in such a way as to prevent the optical end O and the ferrule F from hitting the light-blocking panel portion 406.

The base plate 408 includes a pair of fastening clips 410 on opposite ends of the base plate 408. The fastening clips 410 extend through the clip openings 214 on the coupling sleeve 210. After being inserted through the clip openings 214, they may be bent outward at an angle as best seen in FIG. 3a, thereby held in place by the mechanical friction force exerted by the fastening clips 410 against the clip openings 214. Other fastening methods are also contemplated without deviating from the nature and spirit of the invention.

The base 408 and fastening clips 410 are connected to the bumper 402 by fulcrum 412. In this preferred configuration, the bumper 402, transition 404 and light-blocking panel 406 form a cantilever, whereby the upper portion (the bumper 402, transition 404 and light-blocking panel 406) rotates about the axis of the fulcrum 412.

The shutter 250 is preferably made of a material that is about 0% transmissive (i.e., about 100% opaque), although a material that allows some light emissions to be visible through the shutter 250 is also contemplated without deviating from the spirit and scope of the invention. The material selected should have some shape memory characteristics so that the shutter returns to the position shown in FIG. 4 even after repeated rotation of the shutter 250 about the fulcrum 412. To prevent light from scattering, the light-blocking panel 406 it may be slightly angled from the vertical orientation. One such preferred light-blocking material is stainless steel about one millimeter thick. The shutter 250 may be formed by die cast, cutting and stamping, chemical etching or other methods commonly used in the art.

FIG. 5 is a drawing of a partial cross-sectional view taken along line 5—5 of FIG. 2a before completion of the assembled adapter 200 showing the male connector C before and after insertion. The inserted male connector C first contacts the shutter 250, causing the shutter 250 to rotate down into recess opening 208 (FIGS. 2a and 3). The shutter 250 rotates through an angle of about 20°, and ends up nested in the space below the insertion passage 206 and below the coupling sleeve 210 (FIG. 3a).

As long as the depth D and D' are greater than the distance d (FIG. 1), the ferrule F does not touch any part of the shutter 250. With the type of connector shown in FIG. 1, the outer body B2 is slidable on the inner body B1 along the axis of the ferrule F, and during insertion of the connector C in the adapter insertion passage 206 (FIG. 2a) it may be pushed forward so that the outer body B2 is what makes contact with the shutter 250 to rotate the shutter 250 down. In that event, the distance d from the tip of the ferrule F to the end of the inner body B1 is the same as the distance from the tip of the ferrule F to the end of the outer body B2. (The outer body B2 slides backward on withdrawal, which operates an unlatching mechanism, not shown in detail in the drawing). To ensure that the ferrule F does not touch any part of the shutter 250 during any stage of the insertion, the shutter 250 should not only incorporate the depth D and D' but should also include geometry that does not allow the ferrule F and the shutter 250 to make contact at any time, for a given connector construction (in particular, a standard construction).

Another transverse distance relationship is that between the initial impact point of the connector body B2 on the shutter 250 and the center line of the fulcrum 412. This fulcrum-impact distance should be sufficient that the shearing force exerted on the fulcrum 412, is not too great and so that the initial rotation of the shutter 250 is rapid, without undue wear or damage.

Figure 6:
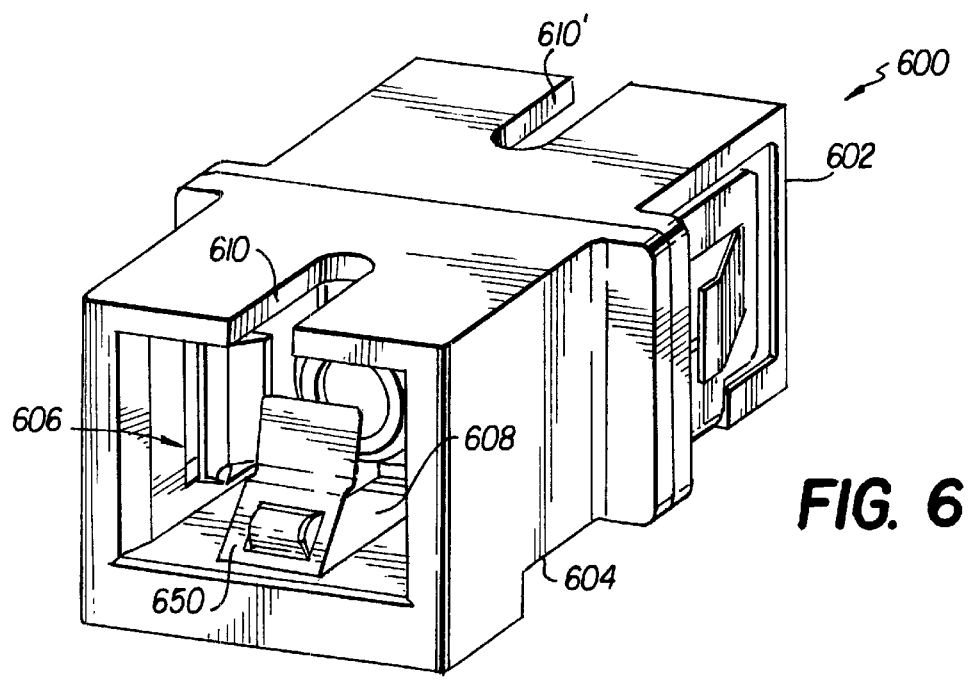
FIG. 6 is a drawing of a perspective view of an assembled, two-piece housing adapter according to another embodiment of the present invention with the shutter in the light-blocking position.
Figure 8:
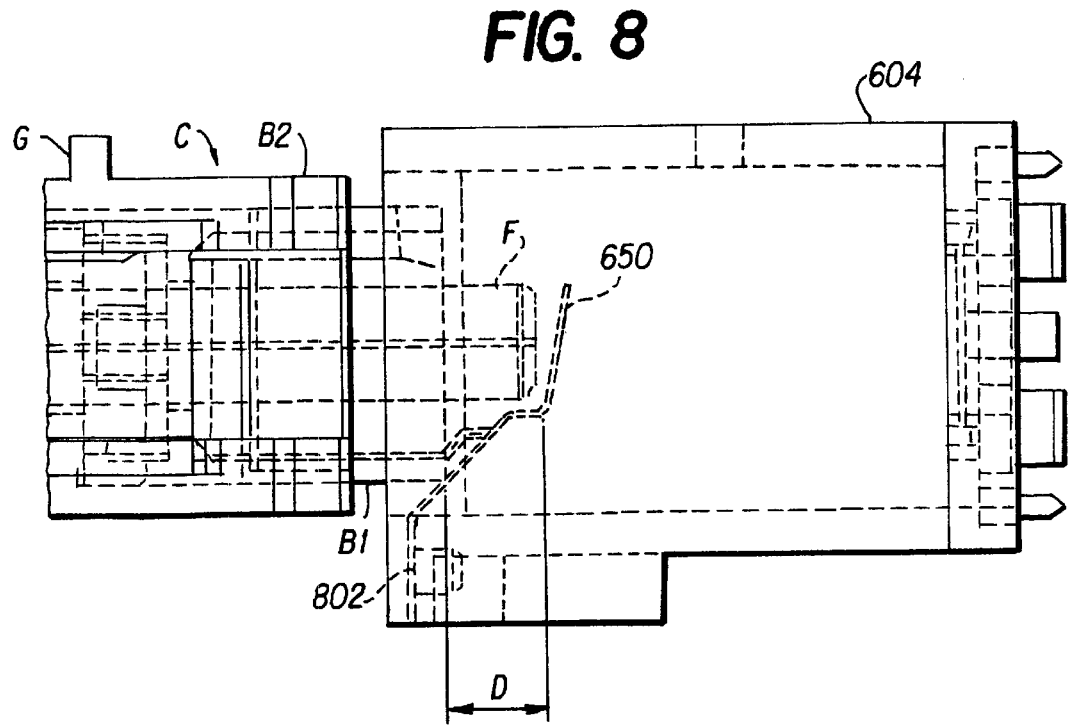
FIG. 8 is a drawing of a side view of the front half of the adapter shown in FIG. 6 showing the position of the male connector during insertion in the adapter.

FIG. 6 is a drawing of a perspective view of an assembled adapter 600 according to another embodiment of the invention with a shutter 650 in the light-blocking position. The adapter 600 includes two housing sections 602, 604 mated together, similar to the assembled adapter 200 shown in FIG. 2a. One method of connecting the two housing sections 602, 604 is to ultrasonically welded them together. The result is a bi-directional adapter in which two male connectors can be inserted, one in the front housing section 604, and another in the back housing section 602. (Of course, a single housing may be used, like that shown in FIG. 2b). The shutter 650 extends inwardly away from the opening of the insertion passage 606 at an angle. The lower portion of the shutter 650 extends through a recess 608 located in the bottom of the housing 604 and connects to the housing 604 as best seen in FIG. 8. The housing sections 602, 604 preferably include slots 610, 610' that mate with a guide G on the outer body B2 of the male connector C, seen in FIG. 1.

FIG. 7 is a drawing of a perspective view of the shutter 650 shown in FIG. 6. The shutter 650 includes a bumper panel portion 702 that supports a dimple 704 that is used to make contact with the inner body B1 or outer body B2 of the connector C (FIG. 1). A transition portion 706 connects the bumper 702 with the light-blocking panel 708. Although described separately, the four portions 702, 704, 706 and 708 can be made from a single piece of material that is formed into the shape shown in FIG. 7. Also, the shape of the individual portions may vary from those illustrated in FIG. 7. For example, the bumper 702, which is shown as a generally flat, rectangular piece in FIG. 4, could be a cylindrical rod or other shape, and it could be curved instead of flat, as long as it supports the dimple 704 such that the dimple 704 makes contact with the connector C to prevent the optical end O and the ferrule F from hitting the light-blocking panel 708. Also, the dimple 704 may have other shapes as long as the shape provides for contact with the connectors inner body B1 or outer body B2 and allows the shutter to swing out of the way during insertion of the connector C.

The base portion 710 of the shutter 650 includes a opening 712 for receiving a rivet, screw, pin or other fastening device 802 (FIG. 8). Preferably, a rivet is used and the base 710 is ultrasonically welded to the housing 604. The base 710 is connected to the bumper 702 by fulcrum 714. In this preferred configuration, the bumper 702, transition 706 and light-blocking panel 708 form a cantilever that rotates about the axis of the fulcrum 714.

The shutter 750 is also preferably made of a material that is about 0% transmissive (i.e., about 100% opaque), although a material that allows some light emissions to be visible through the shutter 650 is also contemplated without deviating from the spirit and scope of the invention. The material selected should have some shape memory characteristics so that the shutter 650 returns to the position shown in FIG. 7 even after repeated rotation of the shutter 650 about the fulcrum 714. To prevent light from scattering, the light-blocking panel 708 may be slightly angled from the vertical orientation. Stainless steel about one millimeter thick is a preferred material for the shutter 750 although other materials are also contemplated. The shutter 750 may be formed by die cast, cutting and stamping, chemical etching or other methods commonly used in the art.

FIG. 8 is a drawing of a side view of the front half of the adapter 600 of FIG. 6 showing the position of the male connector C first contacting the shutter 650 inside the insertion passage 606 (FIG. 6) of the housing 604. The inserted male connector C first contacts the shutter 650, causing the shutter 650 to rotate down into recess opening 608 (FIG. 6). The shutter 650 rotates through an angle of about 45°, in the direction shown by the arrow in FIG. 8, such that the plane of the bumper 702 is essentially parallel to the insertion direction of the connector C and lies nearly flat inside the insertion passage 606.

As long as the depth D shown in FIG. 8 is greater than the distance d (FIG. 1), the ferrule F does not touch any part of the shutter 650. The dimple 704 (FIG. 7) is shaped such that the shutter 650 is moved from its light-blocking position more rapidly. This may be required in some adapters where space considerations limit the distance that $he connector C travels in the insertion passage 606. Without the dimple 704 in the present example, the shutter 650 would not swing completely out of the way of the optical path inside the adapter 600. It will be appreciated by one of skill in the art that the dimple 704 can have any appropriate shape and size that satisfies the requirements of the specific adapter and connector.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A fiber-optic adapter for mating with a fiber-optic connector, the fiber-optic connector having a connector body and a fiber-containing ferrule protruding a distance d from a forward end of the connector body; the adapter comprising:

a first housing forming a first passage for accepting the connector body therein during an insertion of the connector in a longitudinal direction into the first passage;

a first shutter rotatably mounted in the first passage;

wherein the first shutter is supported in a cantilevered manner and includes a light-blocking end inside the first passage and another end connected to the first housing and has a depth D in the longitudinal direction measured from the light-blocking end inside the first passage and the point where the connector body contacts the first shutter so that $D > d;$ whereby the ferrule of the fiber-optic connector does not touch the first shutter, even when the longitudinal axis of the connector body during insertion in the passage is not substantially coincident with the longitudinal axis of the passage.

2. The adapter according to claim 1, wherein the fiber-optic connector body is selected from the group consisting of SC, LC and MTP connectors.

3. The adapter according to claim 1, wherein the shutter comprises a shape that prevents any contact of the ferrule and the shutter during a latter stage of the insertion.

4. The adapter according to claim 1, wherein the light-blocking end inside the passage comprises a light-blocking panel and, when in the light-blocking position, the light-blocking panel extends into the passage substantially perpendicular to the direction of the insertion of the connector.

5. The adapter according to claim 1, wherein the shutter end connected to the housing comprises a base plate attached to the bottom of the housing.

6. The adapter according to claim 1, wherein the shutter is connected to the housing by one or more of a screw, pin, rivet, weld or bolt.

7. The adapter according to claim 1, wherein the shutter automatically returns to its light-blocking position when the connector is removed from the adapter.

8. The adapter according to claim 1, further comprising a first coupling sleeve mounted inside the first housing comprising an inner surface defined approximately by the shape of the connector and at least one latch for securing the connector to the adapter.

9. The adapter according to claim 1, further comprising a wall bisecting the first passage in the transverse direction thereby forming a second passage axially aligned with the first passage for accepting the connector body therein during an insertion of the connector in a longitudinal direction into the second passage.

10. The adapter according to claim 9, wherein the wall and first housing restrict electromagnetic field interference generated on one side of the first housing from being emitted out the other side of the first housing.

11. The adapter according to claim 9, wherein the wall comprises an opening for allowing fiber-optic light from the connector to pass from one passage into the other passage and wherein the wall partially attenuates electromagnetic field interference.

12. The adapter according to claim 9, further comprising:

a second shutter rotatably mounted in the second passage;

wherein the second shutter is supported in a cantilevered manner and includes a light-blocking end inside the second passage and another end connected to the first housing and has a depth D' in the longitudinal direction measured from the light-blocking end inside the second passage and the point where the connector body contacts the second shutter so that $D' > d;$ whereby the ferrule of the fiber-optic connector does not touch the second shutter.

13. The adapter according to claim 12, wherein D equals D'.

14. The adapter according to claim 1, further comprising:
a second housing connected to the first housing forming a second passage axially aligned with the first housing for accepting a second connector body therein during an insertion of a second connector in a longitudinal direction into the second passage;
a second shutter rotatably mounted in the second passage;
wherein the second shutter is supported in a cantilevered manner and includes a light-blocking end inside the second passage and another end connected to the second housing and has a depth D" in the longitudinal direction measured from the light-blocking end inside the second passage and the point where the connector body contacts the second shutter so that $$D">d;$$

whereby the ferrule of the second fiber-optic connector does not touch the second shutter.

15. The adapter according to claim 14, wherein D equals D".

16. The adapter according to claim 12, further comprising a flange extending perpendicular to the outer surface of the housing for attaching the adapter to an external support.

17. A light-blocking shutter for mounting completely inside a connector-receiving passage of a fiber-optic adapter, the shutter comprising a unitary sheet bent into portions, the portions including a light-blocking panel, a bumper panel and a base plate, and wherein a fulcrum is formed along a line between the bumper panel and the base plate parallel to the bumper panel.

18. The shutter according to claim 17, wherein the bumper panel is substantially flat.

19. The shutter according to claim 17, wherein the bumper panel comprises a raised dimple protruding into the connector-receiving passage of the fiber-optic adapter.

20. The shutter according to claim 17, wherein the unitary sheet is made of a material such that the fulcrum automatically moves the bumper panel and light-blocking panel to their original position after a force applied to the bumper panel has been reduced to zero.

* * * * *

UNITED STATES PATENT AND TRADEMARK OFFICE
CERTIFICATE OF CORRECTION

PATENT NO. : 6,688,780 B2
DATED : February 10, 2004
INVENTOR(S) : Duran

It is certified that error appears in the above-identified patent and that said Letters Patent is hereby corrected as shown below:

Column 5,
Line 48, change "welded" to -- weld --.

Column 7,
Line 62, delete "it".

Column 8,
Line 43, change "welded" to -- weld --.

Column 9,
Line 5, change "a opening" to -- an opening --;
Line 44, change "$he" to -- the --;
Line 48, change "of skill" to -- skilled --.

Column 12,
Line 8, change "and wherein a fulcrum" to -- wherein a fulcrum --;
Line 10, after "panel" insert -- and wherein the fastener is one of a pair of clips located on opposite ends of the base plate and extending perpendicular to the base plate and a circular opening on the base plate having a diameter smaller than the width and length of the base plate. --.

Signed and Sealed this

Eighteenth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,688,780 B2
APPLICATION NO. : 10/067270
DATED : February 10, 2004
INVENTOR(S) : Jaime Duran It is certified that error appears in the above-identified patent and that said Letters Patent is hereby corrected as shown below:

Col. 12, line 8, after "plate" insert --and a fastener for fastening the base plate to the adapter--

Signed and Sealed this

Eighteenth Day of November, 2008

JON W. DUDAS
*Director of the United States Patent and Trademark Office*